(12) United States Patent
Dauer

(10) Patent No.: US 12,519,625 B1
(45) Date of Patent: Jan. 6, 2026

(54) SYSTEMS AND METHODS FOR FACILITATING QUANTUM-RESISTANT ENCRYPTION OF DATA

(71) Applicant: Jeffrey Dauer, St. Charles, MO (US)

(72) Inventor: Jeffrey Dauer, St. Charles, MO (US)

( * ) Notice: Subject to any disclaimer, the term of this patent is extended or adjusted under 35 U.S.C. 154(b) by 0 days.

(21) Appl. No.: 19/192,958

(22) Filed: Apr. 29, 2025

(51) Int. Cl.
H04L 9/08 (2006.01)

(52) U.S. Cl.
CPC ............ H04L 9/0852 (2013.01); H04L 9/088 (2013.01)

(58) Field of Classification Search
CPC .............................. H04L 9/0852; H04L 9/088
See application file for complete search history.

(56) References Cited

U.S. PATENT DOCUMENTS 7,159,112 B1 * 1/2007 Williams ................ G06F 21/84
713/168

OTHER PUBLICATIONS

Sectigo, "What are the differences between RSA, DSA, and ECC encryption algorithms?" Sectigo Limited, published Jan. 5, 2021 [online]. Retrieved from https://www.sectigo.com/resource-library/rsa-vs-dsa-vs-ecc-encryption, [retrieved on May 13, 2025]; 6 pages.

* cited by examiner

*Primary Examiner* — Baotran N To
(74) *Attorney, Agent, or Firm* — COOLEY LLP

(57) ABSTRACT

According to an embodiment, a method includes receiving and providing quantum information as input to a quantum logic gate to produce superpositioned information having a plurality of modal states associated with a modal space. Starting with the superpositioned information, a plurality of modal paths associated with the modal space is produced by recursively filtering, for a predefined number of iterations, the superpositioned information based on a coherence behavior to produce intermediate filtered information that is used as input for a next iteration from the predefined number of iterations. Decoherence dynamics is modelled across the predefined number of iterations of the recursive filtering to determine a stability metric for each modal path from the plurality of modal paths. A modal path is selected from the plurality of modal paths based on the stability metric for that modal path, the modal path representing an encryption key.

20 Claims, 7 Drawing Sheets

SYSTEMS AND METHODS FOR FACILITATING QUANTUM-RESISTANT ENCRYPTION OF DATA

FIELD

One or more embodiments described herein relate to systems and computerized methods for implementing entropy-based security systems.

BACKGROUND

Some known cryptographic systems (e.g., that are based on Rivest-Shamir-Adleman (RSA), elliptic-curve cryptography (ECC), the Advanced Encryption Standard (AES), etc.) involve mathematical problems (e.g., factoring, discrete logs, modular arithmetic, and/or the like) to secure data. These known methods are, in at least some instances, vulnerable to some attacks (e.g., that are facilitated by quantum computers using Shor's algorithm, Grover's algorithms, and/or the like). Some known post-quantum cryptographic systems (e.g., lattice-based cryptographic systems) are reliant on classical computational hardness assumptions and are susceptible to algorithmic breakthroughs. Additionally, some known quantum cryptographic systems use physical entanglement-based key distribution (e.g., BB84, quantum key distribution (QKD), etc.) and/or quantum-resistant mathematical transformations, but approach quantum noise and/or decoherence as obstacles to be corrected and/or avoided. Therefore, a need exists for systems and methods configured to facilitate quantum-resistant encryption of data.

SUMMARY

According to an embodiment, a non-transitory, processor-readable medium stores instructions that, when executed by a processor, cause the processor to receive binary data and perform a plurality of bit inversions on the binary data to produce a first set of binary data. Based on a bit ratio band, a first subset of binary data is selected from the first set of binary data. A perturbation is applied to a second subset of binary data from the first subset of binary data based on a coherence-indexed perturbation parameter, to produce a second set of binary data. The instructions further cause the processor to select, based on the bit ratio band, a set of filtered binary data from the second set of binary data. Unstable binary data is removed from the set of filtered binary data based on a consistency metric for the unstable binary data associated with (1) the first subset of binary data and (2) the set of filtered binary data, to produce a set of stable binary data that represents an encryption key.

According to an embodiment, a method includes receiving and providing quantum information as input to a quantum logic gate to produce superpositioned information having a plurality of modal states associated with a modal space. Starting with the superpositioned information, a plurality of modal paths associated with the modal space is produced by recursively filtering, for a predefined number of iterations, the superpositioned information based on a coherence behavior to produce intermediate filtered information that is used as input for a next iteration from the predefined number of iterations. Decoherence dynamics is modelled across the predefined number of iterations of the recursive filtering to determine a stability metric for each modal path from the plurality of modal paths. A modal path is selected from the plurality of modal paths based on the stability metric for that modal path, the modal path representing an encryption key.

According to an embodiment, a method includes receiving, at a classical compute device, binary data and performing, via the classical compute device, a plurality of bit inversions on the binary data to produce a plurality of binary data representing a plurality of states. The method further includes encoding, via a quantum compute device, the plurality of binary data as quantum information having the plurality of states. Starting with the quantum information, the plurality of states is repeatedly filtered at the quantum compute device and based on an entropy threshold, to produce a plurality of filtered state paths. The method further includes selecting, at the quantum compute device, a filtered state path from the plurality of filtered state paths based on a decoherence metric, the filtered state path representing an encryption key.

DETAILED DESCRIPTION

Figure 1:
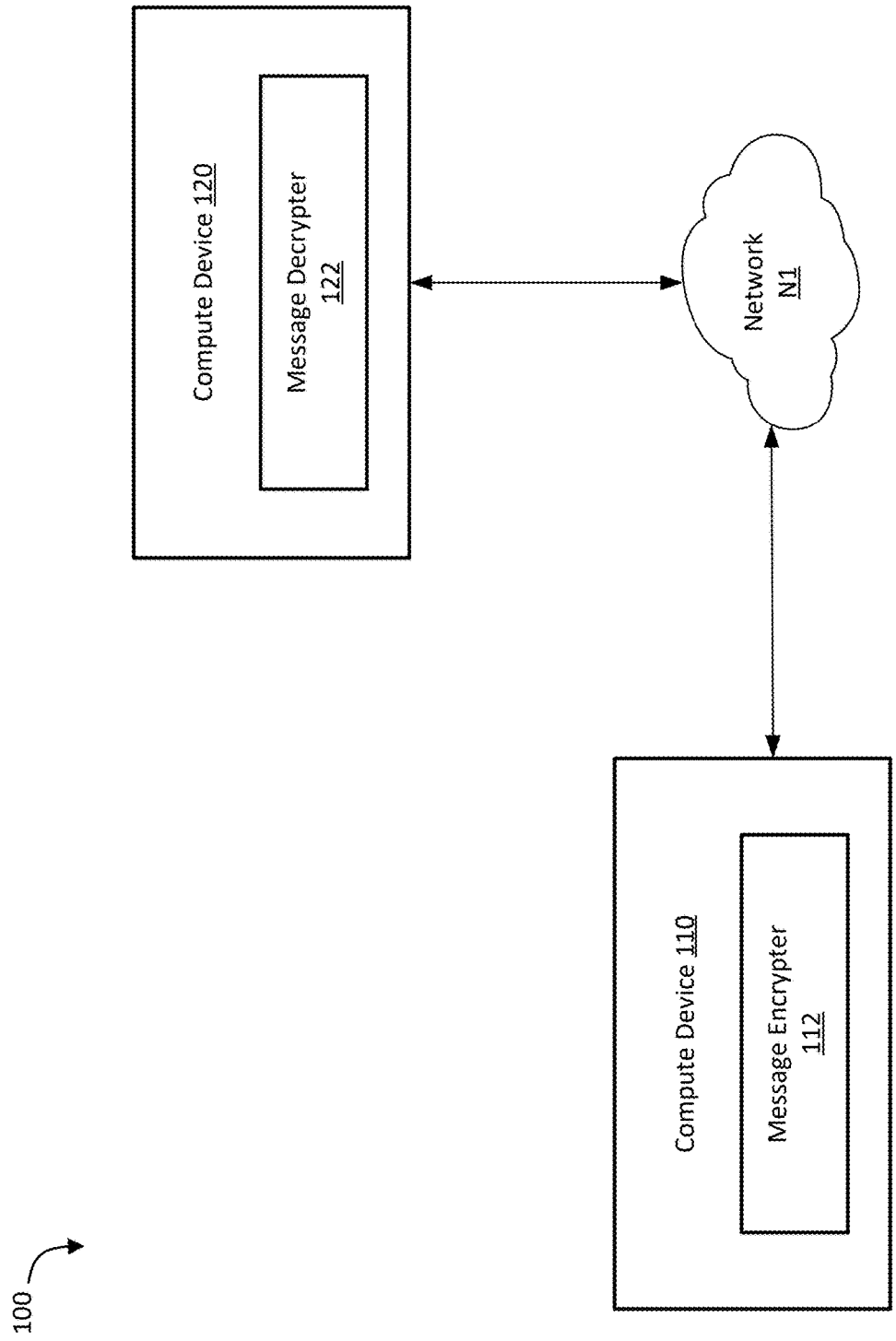
FIG. 1 shows a system block diagram of a cryptographic system, according to an embodiment.

At least some systems and methods described herein facilitate structural encryption by using decoherence as a semantic filtering mechanism. More specifically, at least some systems and methods can leverage quantum entropy and/or decoherence-indexed key selection to protect data from attacks (e.g., unauthorized access), including for example attacks facilitated by quantum compute devices, attacks associated with Shor's algorithm, Grover's algorithm, etc., attacks involving static key reuse, replay attacks, etc. For example, at least some cryptographic systems (also referred to herein as quantum-secure cryptographic systems and/or quantum-resistant cryptographic shields (Q-RCS)) described herein leverages decoherence as an indexical location mechanism (and not, for example, as a collapse process or probabilistic event) to filter quantum state space into stable structural configurations. By treating decoherence as a semantic filtering mechanism, at least some cryptographic systems described herein can extract stable cryptographic truths by interpreting environmental interaction patterns. These cryptographic systems can apply data encryption to protect data from quantum and/or classical attacks, including attacks based on Shor's algorithm, Grover's algorithm, and/or the like. For example, at least some cryptographic systems described herein can perform at least one of entropy filtering, determining and/or applying structural constraints, and/or decoherence mapping to produce encryption keys and/or ciphertext that is resistant to (or can prevent) reversal by at least some mathematical and/or algorithmic methods. More specifically, by grounding security in physical quantum constraints rather than mathematical complexity, at least some cryptographic systems described herein make use of entropy derived from quantum sources and filtered through structural constraints associated with decoherence indexing mechanisms, which are physically real but non-mathematical.

Use cases for at least some systems and methods described herein include, for example, (1) securing financial transactions (e.g., by not involving a public key infrastructure (PKI) and/or factor-based cryptographic protocols, by implementing forward secrecy in encryption, by facilitating quantum resistance for high-value transactions, etc.), (2) facilitating secure cloud storage and/or data transmission (e.g., by encrypting files and/or data streams encrypted with structure-bound keys that cannot (e.g., practicably) be reused or guessed, producing entropy logs to facilitate audit trails, etc.), (3) securing communications, such as military communications, government communications, etc. (e.g., by using a unified Q-RCS channel instead of layered encryption stacks, by validating based (e.g., only) on matched coherence indices, etc.), (4) protecting blockchain and/or digital assets (e.g., by facilitating structure-based key protection for wallets, by tying transaction integrity to entropy structure (e.g., instead of or in addition to ledger state, etc.)), (5) protecting AI infrastructure and/or machine learning model weights (e.g., by securing training data and/or model weights using entropy-generated keys to prevent quantum-hardened model theft), and/or (6) other use cases that can benefit from secure data encryption.

Although some systems and methods are described herein in the context of secure information processing and/or modal-based encryption systems, at least some systems and methods described herein (e.g., that facilitate recursive modal filtering, entropy-constrained path selection, perturbation modeling, and/or stability-based coherence tracking) can be applicable to other information processing systems. These systems and/or methods can include, for example and without limitation, optimization frameworks, quantum and/or hybrid inference engines, decoherence control and/or noise resilience architectures, quantum error mitigation techniques, structure-preserving state-space management, and/or other modal-indexed computational frameworks. Thus, at least some systems and methods described herein relate to other uses beyond cryptographic applications.

At least some systems and methods described herein can be implemented by a general-purpose processor and/or cloud server (e.g., x86, ARM, etc.), which can permit integration into existing security frameworks. Alternatively or in addition, at least some systems and methods described herein can be implemented by an edge compute device and/or an embedded system (e.g., a microcontroller, an application-specific integrated circuit (ASIC), a field programmable gate array (FPGA), etc.) to facilitate secure encryption in a resource-constrained use case (e.g., in an Internet of Things (IoT) device). For example, at least some systems described herein can facilitate lightweight, structure-based authentication in a device that has insufficient compute resources for some known encryption stacks. An authentication mechanism implemented by at least some systems described herein can be lightweight and/or more computationally efficient relative to some known cryptographic protocols because the authentication mechanism does not involve modular arithmetic, prime factorization, and/or elliptic curve operations. Instead, to implement the authentication mechanism, modal state coherence is assessed using deterministic filtering rules over binary state vectors (as described herein), which can be executed using simple bitwise operations. Additionally, because the system avoids public key exchange, certificate verification, and/or complex multi-party key negotiations, the system can operate effectively in resource-constrained environments, including low-power edge devices, embedded controllers, and IoT systems.

A cryptographic system described herein can also be implemented by a hardware security module (HSM) and/or a cryptographic accelerator for high throughput use cases. In some embodiments, as described further herein, a cryptographic system can be implemented by a quantum compute device (e.g., a gate-based quantum computing platform) and/or a quantum-classical hybrid system (e.g., where an entropy source and/or coherence state management operate in tandem with a classical processing layer(s)).

Figure 3:
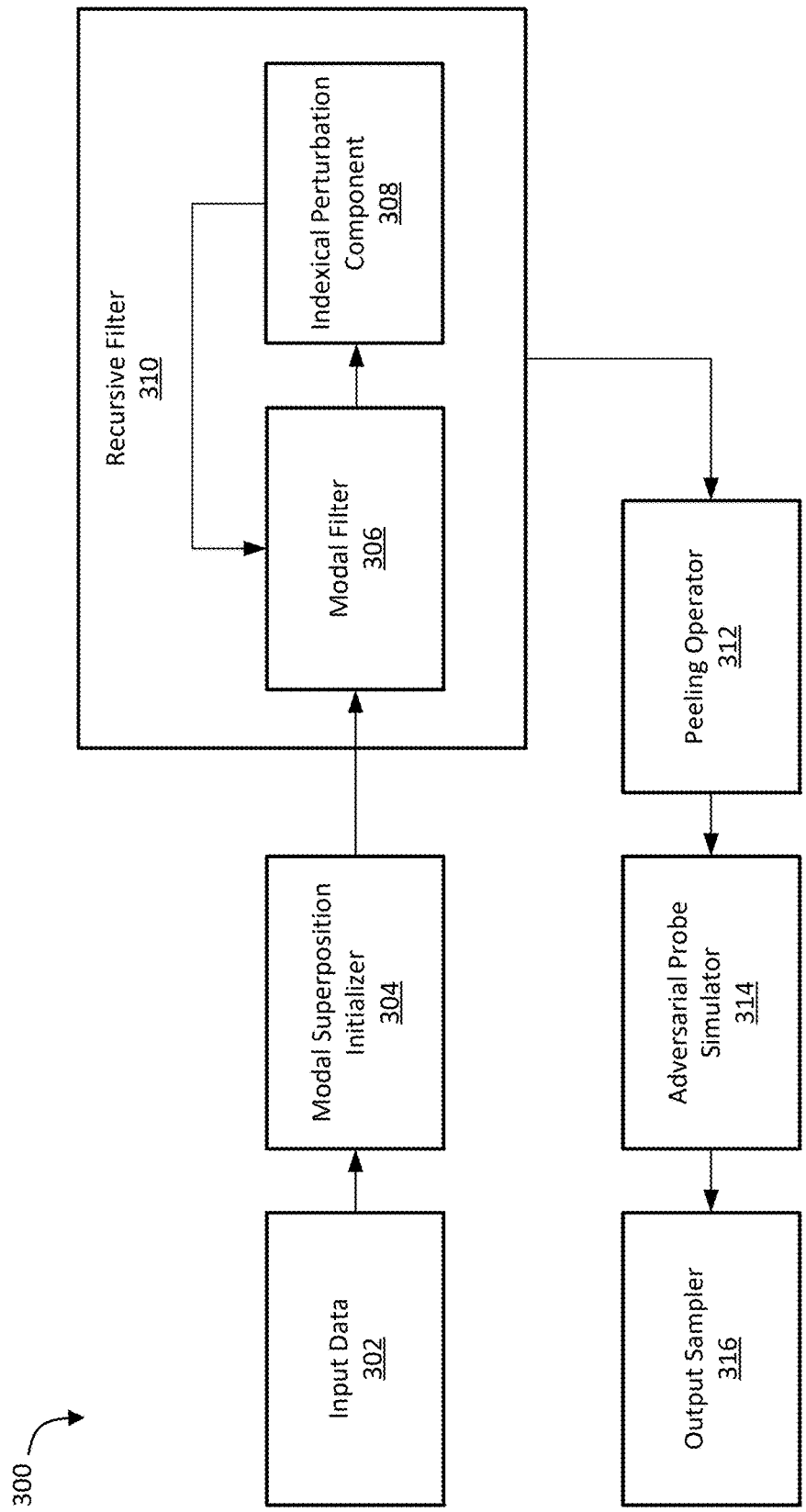
FIG. 3 shows a system block diagram of cryptographic components included in a cryptographic system, according to an embodiment.

A cryptographic system (e.g., that is functionally and/or structurally similar to the cryptographic system 100 of FIG. 1, described herein) can include a quantum entropy input layer (e.g., that produces data similar to the input data 302 of FIG. 3 (described herein) and/or is associated with a quantum random number generator (QRNG) and/or a trusted cloud quantum noise stream), a structural filtering layer that identifies entropy samples that conform to stability constraints, a decoherence indexing layer that selects and/or rejects candidate states for encryption based on coherence behavior, an adaptive encryption layer that uses validated entropy for real-time (or near real-time) symmetric encryption, and/or a logging layer that records entropy parameters and/or filtering decisions for integrity verification.

As described further herein, the decoherence indexing layer can perform semantic decoherence indexing by using decoherence as a modal locator (e.g., and not as a noise signature). More specifically, the decoherence indexing layer can filter incoming information based on its structural fit within a stable index, ensuring that epistemically stable (truth-coherent) messages (e.g., and not unstable messages) are accepted. In at least some instances, the cryptographic system can perform a recursion function to iterate over and re-index modal structures over multiple rounds. This recursive process can enforce internal consistency over time, causing those candidate structures that survive successive modal passes to be retained. This recursion function can promote a self-stabilizing cryptographic architecture, such that errors and/or adversarial insertions decay naturally through recursive modal instability. The cryptographic system can also distinguish intended entanglement from ambient decoherence and/or malicious quantum interference by performing structural comparisons over recursion cycles to detect and reject patterns that do not stabilize under truth-indexing.

The adaptive encryption layer can include a peeling operator, which can strip away unstable modal layers from candidate quantum states, as described herein. More specifically, the peeling operator can recursively remove incompatible and/or entangled substructures until either a truth-coherent residue remains (resulting in an acceptance) or a full semantic collapse occurs (resulting in a rejection). In at least some instances, the peeling operator can function as a structural sieve (e.g., and not a syntactic sieve), enforcing coherence by modal weight (e.g., and not bitwise comparison).

As described herein, the cryptographic system can be further configured to facilitate at least one of entropy-aware modal filtering (e.g., by using a tunable entropy threshold that modulates which states are retained at each recursion layer, preventing deterministic over-collapse), indexical perturbation (e.g., by using a perturbation seed (e.g., that is user defined) to cause controlled index variance during recursion, obscuring repeatable collapse pathways from observers (e.g., attackers)), and/or adaptive recursion depth (e.g., by dynamically adjusting recursion depth based on entropy in a modal field (also referred to herein as a modal space), increasing modal cloud resilience under attack pressure). At least some of these functions can permit the cryptographic system to maintain a distributed modal cloud (e.g., even under conditions designed (e.g., by an attacker) to force convergence). As a result, the output of the cryptographic system can be prevented from collapsing to a single key state. Rather, the output can remain structurally coherent across multiple filtered paths, making it more difficult for an attacker to distinguish modal truth from a false positive.

The structural coherence across multiple filtered paths described above can permit recoverability of true modal paths (e.g., using user-known structural indices) while also producing other modal paths (e.g., output states) that appear valid (e.g., stable) to an attacker, but are not the user-valid key. An attacker therefore can obtain a result that, while seeming correct, lacks any pathway to decrypt data (encrypted with the cryptographic system) without access to an internal constraint structure. This obfuscation can be a product of the recursive modal architecture itself (e.g., and not a product of forced synthesis), where false coherence emerges naturally when the system is probed without correct internal alignment.

As used herein, an adversarial probe simulation can refer to a mechanism that removes dominant modal states after recursive filtering to emulate external probing and ensure output distributions do not reveal high-probability paths. In some instances, the adversarial probe simulation can function as a resilience check against inference or pattern-based attacks.

As used herein, a coherence ratio (also referred to herein as a bit ratio, which can be within a bit ratio band) can refer to a measure of balance within a binary state (e.g., represented by binary data, such as a binary string). In some instances, the coherence ratio can be calculated as the proportion of bit values (e.g., '1's) to total bits. The coherence ratio can be used to determine whether a modal state passes structural filtering thresholds, as described further herein.

Decoherence typically refers to loss of information from a system into the environment. In the context of index determination described herein, the cryptographic system can model decoherence as an active filtering function to determine a stable location (e.g., index) of a message in modal space (e.g., rather than model decoherence as environmental collapse). Stability across recursion layers defines indexical validity, as described further herein.

As used herein, entropy-constrained modal filtering can refer to a process of removing modal states from the data structure that fail to meet coherence thresholds while optionally retaining some outliers probabilistically to maintain entropy and prevent premature convergence.

As used herein, indexical perturbation can refer to localized, probabilistic bit flips introduced into the modal state vector to emulate decoherence, inject entropy, and/or test robustness of surviving states under mild disruption.

As used herein, modal superposition initialization can refer to initial binary data (e.g., an initial binary string) that is expanded into adjacent modal states (e.g., by single-bit inversions). This modal superposition initialization can establish a primary possibility space across modal dimensions.

As used herein, a modal vector can refer to a data structure that holds and/or represents active modal state candidates at a given phase of the encryption process. In some instances, the modal vector can include binary strings representing possible encrypted message configurations.

As used herein, a peeling operator can facilitate filtering by removing transient states that fail to demonstrate positional and/or structural stability across recursive filtering passes. In some instances, the peeling operator can be configured to permit modal configurations that have at least a threshold stability to remain.

As used herein, a quantum reference path (QRP) can refer to a semantic and/or structural record of a recursive filtering trajectory that leads to an encrypted state. More specifically, the QRP can encode how a message stabilizes across multiple rounds of modal filtering, entropy injection, and/or perturbation. The QRP can be used for accurate decryption, as the QRP can trace the specific path through which semantic coherence was achieved during encryption. For the purpose of illustration, in some instances, the QRP can in some respects be analogous to a Feynman path integral in quantum mechanics. For example, just as a Feynman path integral can compute a net effect of possible quantum trajectories, weighted by their interference, the QRP can represent a "constructive path" that survives decoherence-based pruning across a modal possibility space. Other modal paths can cancel or collapse, while the QRP can preserve the structurally consistent trajectory that can be used for decryption.

As used herein, a recursive filtering function can facilitate repeated cycles of entropy filtering and/or indexical perturbation to distill a stable, high-fidelity modal vector. The recursive filtering function can model semantic integrity through layered structural pressure.

As used herein, semantic coherence can refer to a structural property of a state that is internally consistent and stable across recursive noise, entropy, and/or filtering operations. Rather than using key-based security, for example, the cryptographic system can use semantic coherence to secure data.

As used herein, a state vector can include a working list of binary data (e.g., binary strings) representing an evolving encrypted modal space. The cryptographic system can modify the state vector over multiple steps of the encryption process through filtering, perturbation, recursion, and/or sampling.

As used herein, structural entropy can refer to a measure of how diverse and/or unstable a state vector is across filtering cycles. High entropy can promote security through unpredictability, while recursive filtering can temper entropy into coherent convergence.

As used herein, superposition-like expansion can refer to a process of generating multiple candidate modal states from a single binary input (e.g., binary input data). In some instances, the cryptographic system can implement superposition-like expansion on classical and/or hybrid architectures to emulate quantum-like state expansion.

As used herein, a decoherence metric can refer to one or more quantifiable indicators of modal instability, entropy divergence, and/or qubit-level decay. For example, a decoherence metric can include a recursion stability metric that can be determined for each candidate modal path based on that candidate modal path's presence or absence across N recursive filtering passes. A state that appears in all recursion passes performed by a recursive filter (described herein) can have a recursion stability metric of, for example, 0.0 (indicating that the state is fully stable), while states that drop in and/or out across passes can have higher recursion stability metrics.

In some instances, a decoherence metric can include an entropy divergence index (e.g., represented by a Kullback-Leibler (KL) divergence, a normalized Hamming spread, etc.) that represents how modal entropy of a candidate path that is being evaluated during decryption compares to an entropy profile recorded during encryption.

In some implementations (e.g., that involve a quantum compute device), a decoherence metric can include a qubit-level noise signature. More specifically, the decoherence metric can include physical indicators associated with quantum hardware, such as qubit readout noise, signal amplitude decay, fidelity loss, and/or collapse distribution variance.

Decoherence metrics can be computed individually and/or can be aggregated to produce a composite metric that determines whether a candidate path qualifies as structurally valid for decryption, as described further herein.

FIG. 1 shows a system block diagram of a cryptographic system 100, according to an embodiment. The cryptographic system 100 includes a compute device 110, a compute device 120, and a network N1. The cryptographic system 100 can include alternative configurations, and execution of various steps and/or functions of the processes described below can be shared among the various devices of the cryptographic system 100 or can be assigned to specific devices (e.g., the compute device 110, the compute device 120, and/or the like). For example, in some configurations, one compute device can perform the functions of both the compute device 110 and the compute device 120. Alternatively, the cryptographic system 100 can include a compute device(s) in addition to the compute device 110 and the compute device 120.

In some embodiments, the compute device 110, and/or the compute device 120 can include any suitable hardware-based computing devices and/or multimedia devices, such as, for example, a server, a desktop compute device, a smartphone, a tablet, a wearable device, a laptop and/or the like. In some implementations, the compute device 110 and/or the compute device 120 can be implemented at an edge (e.g., with respect to the network N1) node or other remote (e.g., with respect to the network N1) computing facility and/or device. In some implementations, each of the compute device 110 and/or the compute device 120 can be (or be included in) a data center or other control facility and/or device configured to run and/or execute a distributed computing system and can communicate with other compute devices. In some implementations, as described further herein, at least a portion of the compute device 110 and/or the compute device 120 can include a quantum compute device (e.g., that performs operations using qubits and/or by exploiting quantum mechanical phenomena).

The compute device 110 can include a message encrypter 112, which can include software (1) stored at a memory that is functionally and/or structurally similar to the memory 210 of FIG. 2 discussed below and (2) executed via a processor that is functionally and/or structurally similar to the processor 220 of FIG. 2 discussed below. Alternatively or in addition, the message encrypter 112 can be executed via a quantum compute device, as described further herein. The message encrypter 112 can be configured to encrypt data in a manner that can withstand at least some known quantum attacks. More specifically, the encrypter 112 can use modal superposition, entropy filtering, indexical perturbation, and/or recursive selection to transform an initial plaintext configuration into a stabilized, semantically coherent encrypted state. In at least some instances, the encryption process does not depend on known key exchange mechanisms and instead uses a recursive sequence of filtering and perturbation steps that produce high-entropy, structurally constrained state vectors. The encrypter 112 can produce a final state distribution that emulates probabilistic stability as observed in quantum readout environments, that remains structurally deterministic, and/or that cannot be reverse engineered without knowledge of a quantum reference path.

As used herein, "modal path," "filtered state path," and/or "quantum reference path" can refer and/or relate to a progression and/or sequence of modal states that remain stable across recursive filtering. "Quantum reference path" can refer to a semantically coherent state trajectory (e.g., a final state trajectory) that can be used for decryption and/or reconstruction. "Modal path" and/or "filtered path" can refer to intermediate state trajectories generated during recursive filtering cycles (described further herein).

The compute device 120 can include a message decrypter 122, which can include software (1) stored at a memory that is functionally and/or structurally similar to the memory 210 of FIG. 2 discussed below and (2) executed via a processor that is functionally and/or structurally similar to the processor 220 of FIG. 2 discussed below. Alternatively or in addition, the message encrypter 112 can be executed via a quantum compute device, as described further herein. The message decrypter 122 can be configured to decrypt data that has been encrypted by the message encrypter 112, as described further herein.

In some embodiments, the message decrypter 122 can perform decryption by applying similar recursive filtering logic applied by the message encrypter 112 during encryption, using a reference path and/or a modal anchor as a constraint guide. Rather than decrypting via key reversal or brute-force traversal like some known cryptographic methods, the message decrypter 122 can evaluate whether a given modal path conforms to the same (or similar) structural characteristics—such as filtering decisions, entropy metrics, and/or modal coherence profiles—that were recorded or enforced during encryption. A successful decryption can result in recovery of a modal path that matches the quantum reference path and/or the semantic fingerprint of the quantum reference path. If a candidate path deviates in recursion stability, entropy spread, and/or coherence alignment, the message decrypter 122 can reject the candidate path as invalid, ensuring structural integrity and/or tamper resistance without traditional key-based reversal.

In some implementations, the compute device 110 and/or the compute device 120 can implement a user interface, which can include a graphical user interface (GUI) (e.g., displayed on a monitor/display) and/or a programmatic interface, that is configured to receive input data (e.g., unencrypted data, configuration data, perturbation seed data, etc.) from a user via an input device (not shown). More specifically, the user can adjust tunable parameters via the user interface. Examples of tunable parameters include an entropy threshold value(s) (e.g., a float value(s) that indicates a minimum and/or maximum coherence ratio (also referred to herein as a bit ratio band and/or a range of ratios) for retaining a state, having a default of, for example, 0.25-0.75), a perturbation strength value (e.g., a float value that indicates a probability that a given state will be selected for a one-bit flip, having a default value of, for example, 0.1-0.15), a recursion depth value (e.g., an integer value representing a number of cycles of filtering and perturbation, having a default value of, for example, 3-4), a sampling shots value (e.g., an integer value representing a number of final state samples to draw during output distribution, having a default value of, for example, 512-1024), and/or the like. In some implementations, at least some of these tunable parameters can be defined automatically (e.g., without human intervention), as described further herein. These tunable parameters can be adjusted dynamically depending on, for example, system constraints (e.g., associated with a classical, hybrid, and/or quantum system), security targets, throughput requirements, etc.

The compute device 110 can be networked and/or communicatively coupled to the compute device 120 via the network N1, using wired connections and/or wireless connections. The network N1 can include various configurations and protocols, including, for example, short range communication protocols, Bluetooth®, Bluetooth® LE, the Internet, World Wide Web, intranets, virtual private networks, wide area networks, local networks, private networks using communication protocols proprietary to one or more companies, Ethernet, WiFi® and/or Hypertext Transfer Protocol (HTTP), cellular data networks, satellite networks, free space optical networks and/or various combinations of the foregoing. Such communication can be facilitated by any device capable of transmitting data to and from other compute devices, such as a modem(s) and/or a wireless interface(s).

In some implementations, although not shown in FIG. 1, the cryptographic system 100 can include multiple compute devices 110, compute devices 120, and/or another device(s), such as a database, etc. For example, in some implementations, the cryptographic system 100 can include multiple compute devices 110, where each compute device 110 can be associated with a different user from a plurality of users. In some implementations, multiple compute devices 110 can be associated with a single user (e.g., where the user encrypts data to protect the data and, subsequently, decrypts the data for viewing and/or use). Some implementations can include various combinations of the above.

Figure 2:
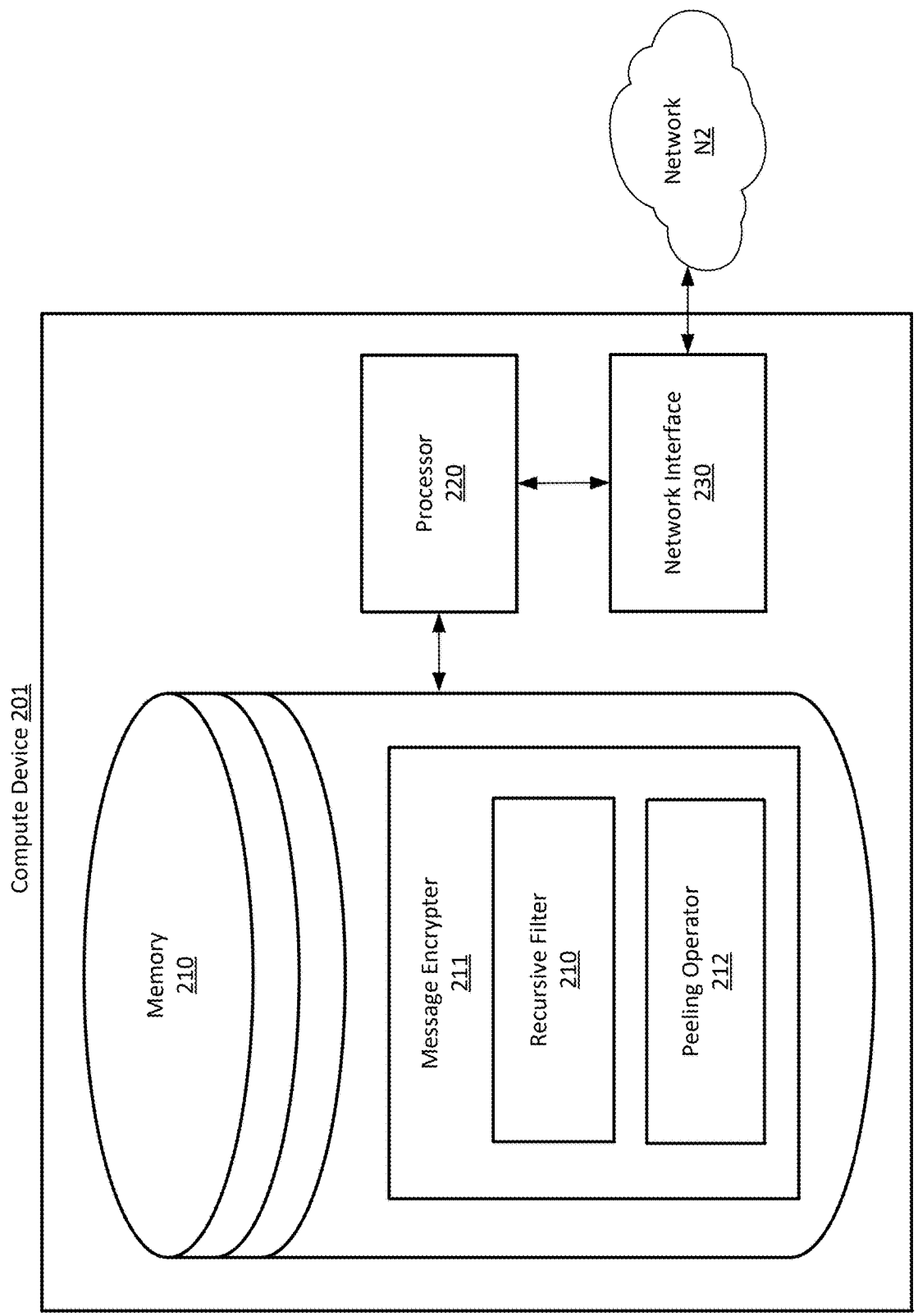
FIG. 2 shows a system block diagram of a compute device included in a cryptographic system, according to an embodiment.

FIG. 2 shows a system block diagram of a compute device 201 included in a cryptographic system, according to an embodiment. The compute device 201 can be structurally and/or functionally similar to, for example, the compute device 110 and/or 120 of the cryptographic system 100 shown in FIG. 1. The compute device 201 can be a hardware-based computing device, a multimedia device, or a cloud-based device such as, for example, a computer, a server, a desktop computer, a laptop, a smartphone, a tablet, a wearable device, a remote computing infrastructure, and/or the like. Alternatively or in addition, in some implementations, the compute device 201 can include a quantum compute device. The compute device 201 includes a memory 210, a processor 220, and a network interface 230 operably coupled to a network N2.

The processor 220 can be, for example, a hardware-based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a graphics processing unit (GPU), a programmable logic controller (PLC), a remote cluster of one or more processors associated with a cloud-based computing infrastructure, and/or the like. The processor 220 is operatively coupled to the memory 210. In some embodiments, for example, the processor 220 can be coupled to the memory 210 through a system bus (for example, address bus, data bus and/or control bus). In some implementations, the processor 220 can include multiple parallelly arranged processors.

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely operatively coupled with the compute device 201, for example, via the network interface 230. For example, a remote database server can be operatively coupled to the compute device 201.

The memory 210 can store various instructions associated with processes, algorithms and/or data, as described herein. Memory 210 can further include any non-transitory computer-readable storage medium for storing data and/or software that is executable by processor 220, and/or any other medium which may be used to store information that may be accessed by processor 220 to control the operation of the compute device 201. For example, the memory 210 can store data associated with a message encrypter 211, which can be functionally and/or structurally similar to the message encrypter 112 of FIG. 1. The message encrypter 211 can include, interact with, and/or otherwise be associated with components that are functionally and/or structurally similar to the cryptographic components 300 of FIG. 3, described herein.

The message encrypter 211 includes a recursive filter 210, which can be functionally and/or structurally similar to the recursive filter 310 of FIG. 3 (described herein). The message encrypter 211 further includes a peeling operator 212, which can be functionally and/or structurally similar to the peeling operator 312 of FIG. 3.

The network interface 230 can be configured to connect to the network N2, which can be functionally and/or structurally similar to the network N1 of FIG. 1. For example, network N2 can use any of the communication protocols described above with respect to network N1 of FIG. 1.

In some instances, the compute device 201 can further include a display, an input device, and/or an output interface (not shown in FIG. 2). The display can be for example any display device (e.g., a monitor, screen, etc.) by which the compute device 201 can output and/or display data (e.g., via a user interface that is structurally and/or functionally similar to the user interface 122 of FIG. 1). The input device can include for example a mouse, keyboard, touch screen, voice interface, and/or any other hand-held controller or device or interface via which a user may interact with the compute device 201. The output interface can include for example a bus, port, and/or other interfaces by which the compute device 201 can connect to and/or output data to other devices and/or peripherals.

In some implementations, the compute device 201 can include a quantum compute device (e.g., a quantum circuit) configured to control coherent quantum states and/or use qubits as a unit of quantum information. In some instances, the compute device 201 can simulate a quantum circuit (e.g., via a classical processor) by executing a quantum simulator (e.g., Qiskit, Cirq, cuQuantum, etc.).

FIG. 3 shows a system block diagram of token substitution components 300 included in a cryptographic system, according to an embodiment. The cryptographic system can be functionally and/or structurally similar to the cryptographic system 100 of FIG. 1. The token substitution components 300 can be associated with and/or executed by a compute device (e.g., a compute device that is structurally and/or functionally similar to the compute device 201 of FIG. 2 and/or compute devices 110 and/or 120 of FIG. 1). In some instances, at least a portion of the token substitution components 300 can be software stored in memory 210 and configured to be executed via the processor 220 of FIG. 2. In some instances, at least a portion of the token substitution components 300 can be implemented in hardware.

The token substitution components 300 receive input data 302 and include a modal superposition initializer 304, a recursive filter 310 that includes a modal filter 306 and an indexical perturbation component 308, a peeling operator 312, an adversarial probe simulator 314, and an output sampler 316. At least a portion of the modal superposition initializer 304 and/or the modal filter 306 can be functionally and/or structurally similar to the decoherence indexer 208 of FIG. 2. The recursive filter 310 can be functionally and/or structurally similar to the recursive filter 210 of FIG. 2, and the peeling operator 312 can be functionally and/or structurally similar to the peeling operator 212 of FIG. 2. Each component from the token substitution components 300 is described in further detail below, followed by a description of the token substitution components 300 in use.

The input data 302 can include, for example, base binary data, such as a base binary string (e.g., '000' and/or any other binary string). Alternatively or in addition, the input data 302 can include quantum information having quantum entropy and encoded by qubits. The quantum information having the quantum entropy can be associated with a quantum entropy input layer and/or can be generated by a quantum random number generator (QRNG), such as a local QRNG, and/or a quantum noise application programming interface (API). The input data 302 can further include plaintext (e.g. unencrypted data to be encrypted) and/or a metadata and/or configuration file (e.g., that specifies an entropy source, a structural filtering mode, a security level, etc.).

The modal superposition initializer 304 can receive the input data 302 as input to generate a first-order superposition-like set by flipping bits (e.g., individually) within the base binary data of the input data 302 to generate additional binary data representing additional quantum states (e.g., superpositioned information). More specifically, the modal superposition initializer 304 can receive an initial binary string representing the untransformed message state. The modal superposition initializer 304 can sequentially invert a bit position(s) (e.g., each bit position) in this string is (e.g., 0→1 and/or 1→0) to produce a new binary configuration. The modal superposition initializer 304 can repeat this operation across a plurality of (e.g., all) bit positions of the initial binary string, generating a family of related states that each differs from each other and/or the base input (e.g., by one bit).

These bitwise perturbations performed by the modal superposition initializer 304 can emulate a modal expansion (e.g., that is analogous to a primitive superposition) across a plurality of (e.g., all) accessible first-order transformations of the base state. The modal superposition initializer 304 can produce a resulting state vector that captures the adjacent modal landscape and/or defines raw data from which recursive filtering (described below) can refine stability. Similarly stated, the modal superposition initializer 304 can produce a (e.g., fully) enumerated set of binary states (e.g., a modal vector and/or a state vector) representing a base configuration (as represented by the input data 302) and the base configuration's one-bit neighbors. This set of binary states can become the initial modal field for the semantic filtering described below. In some instances, the modal superposition initializer 304 can be implemented via a classical compute device, whereas a quantum compute device can use quantum logic gates to cause superposition within quantum information (e.g., qubits) to produce superpositioned information, as described further herein.

The modal filter 306 can include an entropy-constrained modal filter that filters the state vector generated by the modal superposition initializer 304. More specifically, the modal filter 306 can be configured to retain (e.g., only) states with sufficient internal structural balance (e.g., coherence). In some implementations, the modal filter 306 can be further configured to retain states through a deterministic rule(s) configured to emulate probabilistic diversity in environments where modal noise would otherwise arise, as described further below.

For each binary string (e.g., state and/or mode) in the modal vector received from the modal superposition initializer 304, the modal filter 306 can calculate the ratio of a bit value (e.g., '1's) to the total number of bits. This ratio (referred to as a coherence ratio) can approximate structural symmetry and/or modal balance within the binary string. States falling within a predefined coherence band (e.g., 25% to 75%) can be output by the modal filter 306 (e.g., according to a deterministic rule), these states being sufficiently balanced to represent plausible semantic candidates.

In some implementations, to prevent premature collapse of the modal landscape and/or preserve system entropy, the modal filter 306 can apply a secondary selection rule to admit low-coherence and/or high-coherence outliers (e.g., through a structurally deterministic rule(s) that mimics probabilistic inclusion externally but isn't truly stochastic). Similarly stated, the modal filter 306 can include, based on a structural filtering constraint, states in the output that do not otherwise fall within the predefined coherence band. More specifically, the modal filter 306 can determine a hash value of a state identifier (ID) and/or a state index. The hash value can include, for example, a truncated SHA-256 digest of the binary representation, and, in some implementations, the hash value can then be normalized to a float (e.g., between 0.0 and 1.0) and/or compared against a predefined threshold (e.g., 0.05). If the hash-derived value for an outlier state falls below the threshold, the modal filter 306 can include the state in the filtered set, despite the coherence ratio of that outlier state being outside the main acceptance band. This secondary selection rule can promote entropy preservation through structurally deterministic selection, preventing modal collapse without introducing true randomness.

This additional selection rule can promote exploration breadth, which can guard against over-filtering early in the recursive process. The output of the modal filter 306 can include a reduced modal vector (as compared to the modal vector received as input by the modal filter 306) that includes semantically coherent (e.g., sufficiently coherent) candidate states and, optionally, entropy-preserving noise states. This filtered population serves as the input for indexical perturbation component 308, described below.

The indexical perturbation component 308 can apply a perturbation(s) (e.g., a local and/or low-strength perturbation(s)) to the modal state vector received from the modal filter 306. By applying the perturbation(s), the indexical perturbation component 308 can emulate decoherence effects and/or prevent (or reduce) rigid structural convergence.

In some implementations, the indexical perturbation component 308 can select a subset of states (e.g., represented by a subset of binary strings) from the received modal state vector for perturbation based on a probabilistic strength variation and/or without introducing stochasticity. More specifically, for each selected state from the subset of states, the indexical perturbation component 308 can select, using pseudorandom scaffolding (described further below), a bit position(s) and apply a bit flip(s) at that bit position(s), resulting in an adjacent (e.g., perturbed) modal state. The pseudorandom scaffolding can be configured to emulate environmental effects (e.g., and can be configured to not introduce stochasticity into the modal path alignment facilitated by recursive constraint (described herein)). The resulting adjacent modal state can emulate decoherence-driven drift and/or adversarial environmental noise. The effect of the perturbation applied by the indexical perturbation component 308 can include (1) increased entropy as a result of injecting minimally disruptive noise and/or (2) a test of stability of the received modal configuration as a result of forcing resilience to local fluctuation. Only modal patterns robust to such minor perturbations will survive recursive pruning. The indexical perturbation component 308 produces a perturbed modal vector that includes the coherent states received from the modal filter 306 and a population of nearby but noisier variants.

As used herein, pseudorandom scaffolding can refer to a deterministic, constrained, and/or pseudorandom process for implementing indexical perturbation. More specifically, for each candidate modal state, a pseudorandom bit flip can be generated using a seeded function applied by the indexical perturbation component 308. The seed can include, for example, a combination (e.g., a concatenation) of the modal state's binary string and the modal state's recursion depth. A deterministic hash function (e.g., SHA-256, Blake2, etc.) can be applied to the seed to generate a pseudorandom bit index (also referred to herein as a coherence-indexed perturbation parameter). This index can identify the position in the state string to flip (e.g., such that the indexical perturbation component 308 can invert the bit at that position). In some implementations, whether the indexical perturbation component 308 flips a bit can be gated by a secondary threshold derived from the hash value (e.g., the indexical perturbation component 308 can perform the flip only if the normalized hash score is below a predefined threshold (e.g., 0.15)). This pseudorandom scaffolding process facilitates low-strength perturbations that emulate decoherence drift while preserving deterministic reproducibility for downstream validation.

The modal filter 306 and the indexical perturbation component 308 can be included in the recursive filter 310, such that the perturbed modal vector is provided back to the model filter 306 for recursive processing (e.g., to produce intermediate state vectors). The modal filter 306 and the indexical perturbation component 308 can perform a predetermined number of passes (in other words, facilitate a predetermined recursion depth) as a result of being included in the recursive filter 310. In some implementations, the recursive filter 310 can facilitate a fixed, predefined number of iterations of filtering (e.g., two iterations, three iterations, etc.). In some implementations, the recursive filter 310 can facilitate an adaptive/dynamic recursive depth/predefined number of iterations that can be based on entropy spread (e.g., a variance across elements of the state vector and/or other entropy spread metric) within the modal vector received from the modal superposition initializer 304. For example, the recursive filter 310 can facilitate more iterations if the modal vector received from the modal superposition initializer 304 has more spread (e.g., if the states of the modal vector have more variation relative to each other).

Each pass facilitated by the recursive filter 310 can progressively prune (e.g., filter out) unstable and/or low-coherence states while reinforcing patterns (e.g., states) that persist under modal stress testing. Similarly stated, the recursive filter 310 can perform selective amplification of internal structure (e.g., modes), where each cycle can act like an integrator of modal consistency by gradually distilling the input into a core set of high-fidelity patterns. The recursive filter 310 can discard structural anomalies that do not survive recursion loops. As a result, the recursive filter 310 can, in at least some instances, filter not based just on one-pass coherence, but on temporal and structural stability over multiple passes.

In at least some embodiments, the recursive filter 310 can implement a logging layer that can record modal filtering decisions and/or entropy-related metadata at each recursion depth. For example, the system can log the number of states retained during each filtering pass, representing this number of states as an integer and/or as a normalized entropy ratio (e.g., retained to total). The system can also log a bitwise coherence metric(s) across the modal field. A bitwise coherence metric can include, for example, an average Hamming distance from a modal anchor (e.g., a predefined binary string) and/or a bit ratio within surviving states. Filtering decisions can be stored in a structured data format such as, for example, a nested list of binary vectors with associated pass/fail tags and/or a compressed hash map of state identifiers and filtering results. This log can be used for downstream integrity verification by comparing the recorded filtering trajectory against a reconstructed decryption path, ensuring that the modal path used during decryption aligns with the structural dynamics observed during encryption.

The recursive filter 310 can output a convergence-oriented modal set representing states that have passed repeated coherence checks and survived entropic instability. More specifically, the recursive filter 310 can produce an output (e.g., a set of states) with each recursion pass, such that the peeling operator 312 (described below) can track state paths across recursion passes. These states can be provided as input to the peeling operator 312. The peeling operator 312 can perform an internal pass to strip (e.g., filter) out false stabilizations and/or short-lived coherence blips. More specifically, the peeling operator 312 can evaluate a temporal persistence of each modal state across multiple recursive passes, tracking how consistently each state appears in the modal vector throughout the filtering and perturbation cycles performed by the recursive filter 310. If a state's presence is highly variable (e.g., appearing in one iteration and being filtered out in the next) and/or if a state fluctuates in structure, the peeling operator can flag the state as being unstable and remove the state from the modal vector.

In some implementations, the peeling operator 312 can perform an additional filtering operation by comparing the relative entropy footprint and/or bit-level locality of a state across recursion iterations. If the state's index (e.g., its position in the vector/modal space) varies above a threshold across passes of the recursive filter 310, and/or if the state does not sufficiently contribute to the converged structural distribution after the recursion iterations, that state can be pruned. The peeling operator 312 can therefore perform a modal crystallization pass(es) by removing transient states that might have passed entropy thresholds but failed to sufficiently hold semantic location across recursive decoherence.

To summarize the above, the peeling operator 312 can identify and eliminate states that have (1) inconsistent presence across recursion outputs, (2) high variance in modal index location, and/or (3) low contribution to a structural coherence signature (e.g., modal entropy metrics and/or recurrence stability data). As a result, the peeling operator 312 can output a narrowed (e.g., filtered), stable set of recursively persistent modal states that have passed structural, temporal, and/or locational coherence checks. These states can be represented by a reference path, and the states can further form an encrypted semantic representation that is recoverable using (e.g., only) the path.

More specifically, the peeling operator 312 can apply a modal entropy signature function, computing a structural entropy profile for the filtered state vector at each recursion layer (e.g., based on state count, Hamming spread, and/or bit ratio variance). The peeling operator 312 can express this structural entropy profile as, for example, a list of normalized entropy values (e.g., 0.76, 0.54, 0.29) and/or can be stored as part of an integrity log.

Alternatively or in addition, the peeling operator 312 can perform a modal recurrence validation function to track persistence of individual modal candidates across recursion iterations (e.g., "State 011001 appeared in 3 out of 4 cycles"). The peeling operator 312 can accept a modal path if a recurrence for that modal path exceeds a predefined stability threshold. The peeling operator 312 can perform the modal entropy signature function and/or the modal recurrence validation function (individually or in combination) to generate a structural coherence signature for downstream validation.

As used herein, a "dominant mode" can refer to a modal state that, following recursive filtering (e.g., by the recursive filter 310) and/or output sampling (e.g., by the output sampler 316, described herein), appears with disproportionately high frequency relative to other surviving modal candidates. For example, in a hardened state vector with 20 remaining modal states, if one state appears in over 50% of the filtered output samples while others appear uniformly or near-uniformly, that state can be designated as a dominant mode. Dominant modes can arise naturally due to structural resilience, but dominant modes' consistent recurrence can expose the dominant modes to inference and/or frequency analysis by an attacker. Thus, the adversarial probe simulator 314 can be configured to delete one or more dominant modes (e.g., using pseudorandom scaffolding) during adversarial probe simulation to promote statistical obfuscation and/or reduce attack surface.

The adversarial probe simulator 314 can receive the stabilized state set (e.g., crystalized modal vector) produced by the peeling operator 312 and simulate an external probe or attack by removing a dominant element from the stabilized state set. More specifically, the adversarial probe simulator 314 can select, deterministically with entropy-like dispersion emulated through pseudorandom scaffolding, a state(s) from the stabilized state set and delete that state(s) to prevent (or reduce the likelihood of) a dominant state pattern that could leak useful information to an attacker. Because adversarial probes employed by attackers typically rely on isolating patterns and/or dominant paths that can be targeted and/or statistically exploited, by removing the dominant mode and retaining a distributed, non-redundant modal space, the adversarial probe simulator 314 can prevent an attacker from inferring reconstruction logic from output distributions. The state vector produced by the adversarial probe simulator 314 can be robust to frequency analysis and/or differential probing because the remaining states no longer reflect a highly (e.g., most) probable message structure. Rather, the state vector produced by the adversarial probe simulator 314 can include states that survived the recursive noise and modal entropy layers implemented by the recursive filter 310 and the peeling operator 312, respectively.

To illustrate the adversarial probe simulator 314 in use, instead of deterministically knocking-out the strongest state from the stabilized state set (otherwise an attacker could predict that knocking-out), the adversarial probe simulator 314 can generate a deterministic hash (e.g., that represents a modal coherence variation and/or a constrained coherence variation) for each surviving state and delete the state with, for example, the lowest or highest hash score. Similarly stated, the adversarial probe simulator 314 can remove semantically redundant stable binary data from the stabilized state set. As a result, the deletion can appear unpredictable to an attacker but can be reproducible on the encryption side via the cryptographic components 300. Similarly stated, the adversarial probe simulator 314 can structurally thin the modal cloud without introducing randomness that breaks reversibility.

In some implementations, the adversarial probe simulator 314 can select modal states for deletion during adversarial probe simulation using a deterministic pseudorandom mechanism similar to the pseudorandom scaffolding described above in relation to the indexical perturbation component 308. For example, each modal state can be hashed (e.g., using a non-cryptographic digest of its binary value) to generate a normalized score. The state with, for example, the maximum or minimum hash-derived score can then be selected for deletion. This approach allows the system to deterministically remove a structurally dominant candidate without involving stochastic randomness. This structural thinning reduces the risk of inference attacks by eliminating modal outliers that appear disproportionately in the final output, obfuscating statistical patterns without compromising path reproducibility.

As described above, by producing the encrypted state vector via the adversarial probe simulator 314, the cryptographic components 300 can model decoherence not as passive environmental collapse, but as an active filtering mechanism that recursively narrows the modal space. As a result of this decoherence modelling, at least some attempts by an external attacker to emulate the encryption process without access to the internal recursion path will yield a false positive (e.g., a coherent, pristine structure that appears internally valid but has no bearing on the true message location). Similarly stated, the cryptographic components 300 can generate internally stable artifacts that are epistemically indistinguishable from valid outcomes, but which are structurally untethered from the actual semantic encoding, making adversarial decryption efforts structurally misled in addition to being computationally hard.

The adversarial probe simulator 314 can output a filtered, hardened (e.g., as to an adversary) state vector that has been cleared of a dominant deterministic path(s) and/or is resilient to structural inference and/or spoofing attempts. The output sampler 316 can receive the hardened state vector from the adversarial probe simulator 314 and sample the hardened state vector (e.g., repeatedly) to generate a structurally emulated modal density output. Similarly stated, the output sampler 316 can use a deterministic sampling function to mimic a quantum readout. More specifically, the output sampler 316 can select, using structured pseudorandom logic for modal emulation, states from the hardened state vector (e.g., according to a deterministic sampling rule), which can emulate the effect of a uniform quantum readout distribution under partial collapse. The output sampler 316 can output distribution data (e.g., histogram-like data) that encodes the encrypted state distribution. This distribution data (also referred to herein as structurally differentiated output distribution data) can be used for downstream encryption, comparison, verification, and/or reference reconstruction.

Describing the output sample 316 in more detail, in some implementations, the output sampler 316 can include a deterministic pseudorandom mechanism to select states from the hardened modal vector based on semantic variation. For example, the output sampler 316 can hash each state in the hardened set (produced by the adversarial probe simulator 314) using a consistent, non-cryptographic hash function (e.g., SHA-256 truncated to 16 bits). The output sampler 316 can normalize the resulting hash value to a float between 0.0 and 1.0. The output sampler 316 can select states whose normalized values falls below a predefined sampling threshold (e.g., 0.25) and/or can use modular arithmetic (e.g., hash (state) % k==0) to ensure sampling balance. This logic implemented by the output sampler 316 allows structurally deterministic sampling that emulates probabilistic output (e.g., that looks probabilistic to external observers) while preserving reproducibility for downstream verification. The output sample 316 can structurally emulate quantum partial collapse by preserving only a subset of the modal cloud, in a manner sensitive to the internal state configuration but resistant to external prediction or replay.

In some implementations, the cryptographic components 300 can include an entropy-coherence vault (not shown explicitly in FIG. 3), which can include a record-keeping system that logs how entropy evolved across recursion performed by the recursive filter 310 and/or which modal states were stable across the recursion (e.g., in addition to or instead of logging which states were maintained or discarded). The entropy-coherence vault can therefore act as a structural audit trail. For example, the entropy-coherence vault can log the entropy metric(s) at each pass, the number of states filtered out, and/or the recurrence of specific state IDs. Then, during decryption, a modal path can be checked and/or matched against the log. If the modal path does not align with the log (e.g., due to structural instability and/or entropy mismatch), it can be determined that the input has been tampered with and/or does not belong to the original encryption trajectory. The entropy-coherence vault can therefore perform integrity verification without involving some known key-based reversal methods.

More specifically, an entropy-coherence vault can include a structured integrity log that stores metadata representing and/or associated with entropy behavior and/or modal coherence during recursive filtering. In some embodiments, the entropy-coherence vault can store and/or include at least one of a normalized entropy metric(s) recorded at each recursion depth (e.g., state count, coherence ratio, entropy spread, etc.), structural persistence data (e.g., recurrence profiles of modal states across recursive filtering iterations), and/or a filtered candidate identifier(s) and/or index (or indices), associated with pass/fail coherence thresholds.

The entropy-coherence vault can function as a semantic integrity ledger, permitting the system to validate whether a candidate decryption path conforms to the structural dynamics observed during encryption. If an incoming modal path fails to match the entropy and/or coherence characteristics logged in the vault, the system can reject the path as being invalid and/or tampered with.

In some implementations, the cryptographic components 300 can be implemented on a classical processor (e.g., that is functionally and/or structurally similar to the processor 220 of FIG. 2) using data structures like binary strings, lists, and entropy-controlled probabilistic filters. The recursive filtering performed by the recursive filter 310, the indexical perturbation performed by the indexical perturbation component 308, and/or the modal coherence checks performed by the peeling operator 312 and/or the adversarial probe simulator 314 can be computationally tractable with standard hardware. Classical randomness (e.g., to emulate quantum entropy) can be externally supplied (e.g., using a secure pseudorandom number generator(s)). In at least some instances, this classical randomness does not alter the deterministic nature of at least some of the encryption methods described herein. Modal filtering and/or entropy thresholds can be enforced through algorithmic rules and/or statistical checks on bit-level patterns, and output distributions can be robust (e.g., even in purely classical environments).

In some implementations, the cryptographic components 300 can be implemented by a classical-quantum hybrid system, where modal filtering and entropy injection steps can be implemented using classical control logic, while indexical perturbation and recursive state propagation can be offloaded to quantum subroutines (e.g., gate-level operations on a NISQ device(s)). More specifically, a classically implemented pre-processing stage can initialize state vectors and/or coherence metrics, and a quantum device(s) can inject entanglement, perform deterministic modal resolution emulating probabilistic output without stochastic generation, and/or model decoherence dynamics across qubits. Benefits of implementing the cryptographic components 300 on a classical-quantum hybrid architecture (e.g., as compared to a classical-only architecture) include improved randomness quality, better entropy modeling, and/or more authentic decoherence behavior using qubit state decay and/or readout noise.

Describing the classical-quantum hybrid system in more detail, in some embodiments, the cryptographic components 300 shown in FIG. 3 can be implemented using a combination of classical and quantum compute systems. More specifically, using classical control systems/logic, (1) the modal superposition initializer 304 can perform deterministic bit inversions and state expansions, (2) the modal filter 306 can apply entropy-based thresholds and/or coherence ratio checks using bitwise arithmetic, (3) the recursive filter 310 can manage iterative filtering cycles and entropy metrics, (4) the peeling operator 312 can track state stability over time using recurrence counters and/or entropy weighting functions, (4) the adversarial probe simulator 314 can apply deterministic structural thinning using pseudorandom scaffolding, and (5) the output sampler 316 can implement deterministic sampling logic based on hash normalization.

Optionally, using a quantum compute device, the indexical perturbation component 308 can be offloaded to and/or executed by a quantum device to emulate environmental decoherence via entanglement and/or native noise gates. Additionally, the peeling operator 312 can be implemented by the quantum compute device to incorporate quantum coherence tracking using quantum measurement history or qubit decay dynamics, permitting the peeling operator 312 to track subtle entanglement over time. This modular configuration of the classical-hybrid system permits the cryptographic components 300 to be fully executed on classical hardware and/or selectively enhanced through quantum-native components in hybrid deployment environments.

In some implementations, the cryptographic components 300 can be implemented on a quantum-native stack. For example, a quantum compute device can include a quantum logic gate(s) (e.g., a Hadamard gate, an RX gate, a RZ gate, etc.) to engender superposition (e.g., to implement the modal superposition initializer 304). The quantum compute device can further include a coherence-aware gate sequence(s) and/or be configured to perform controlled entanglement to facilitate modal filtering (e.g., to implement the modal filter 306). The quantum compute device can also model decoherence natively via qubit instability and/or circuit noise. The peeling operator 312 can be implemented by comparing (1) recursion paths through measurement histories and/or (2) entangled state behavior over time. The quantum compute device can emulate adversarial probes (e.g., can implement the adversarial probe simulator 314) by statistical thinning across multi-shot measurements. The quantum compute device can further map quantum reference paths to a quantum register acting as an addressable semantic path, and state collapse can emulate a final encryption output.

By implementing the cryptographic components 300 on a quantum compute device, entropy can be increased (or maximized), native parallelism can be achieved, and/or high resistance to classical attack models can be achieved.

Figure 4:
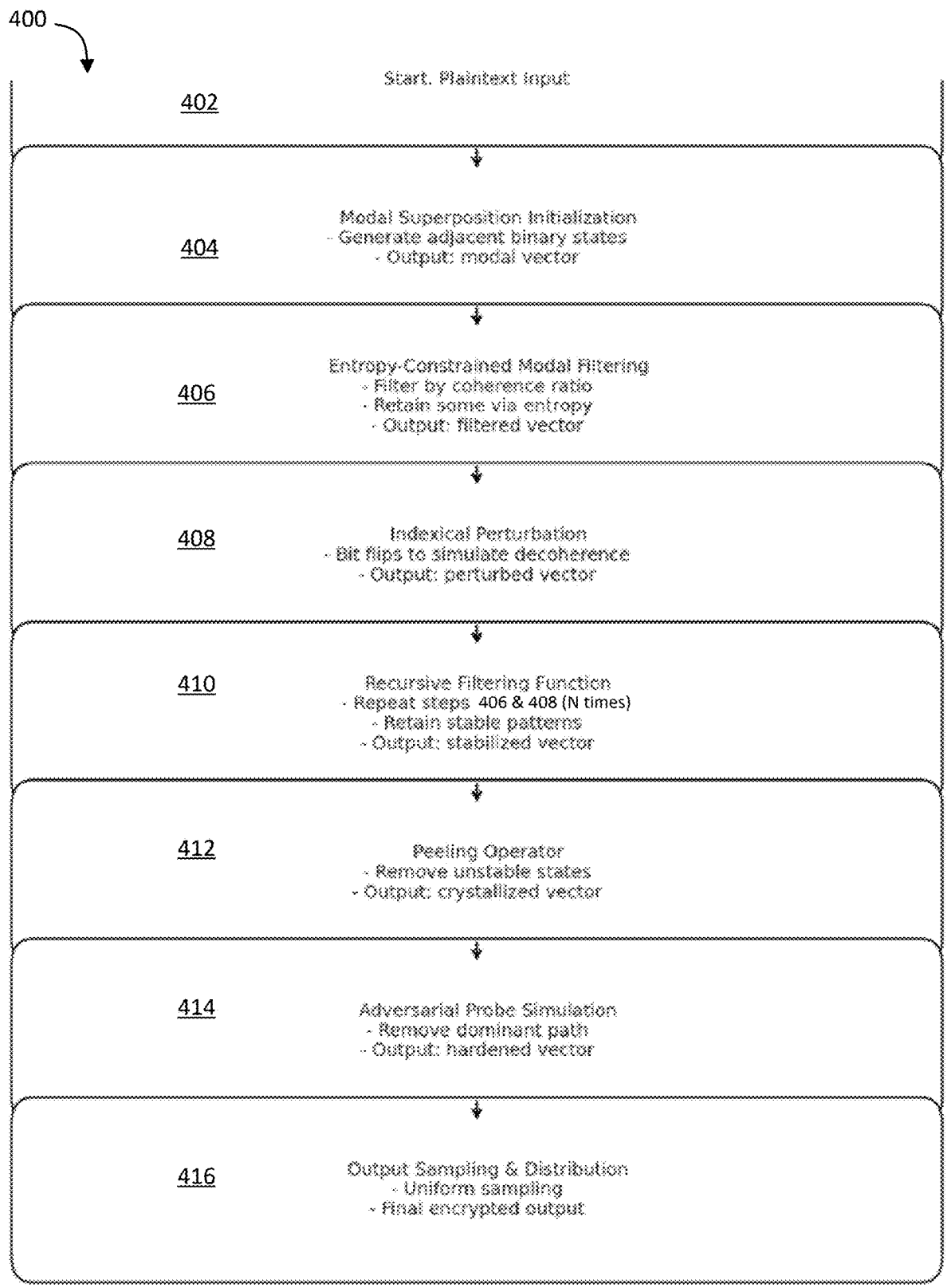
FIG. 4 shows a flow diagram illustrating a method implemented by a cryptographic system to produce an encrypted output, according to an embodiment.

FIG. 4 shows a flow diagram illustrating a method 400 implemented by a cryptographic system to produce an encrypted output, according to an embodiment. The method 400 can be implemented by a cryptographic system described herein (e.g., the cryptographic system 100 of FIG. 1). Portions of the method 400 can be implemented using a processor (e.g., the processor 220 of FIG. 2) of any suitable compute device (e.g., the compute device 201 of FIG. 2 and/or the compute devices 110 and/or 120 of FIG. 1). In some implementations, at least a portion of the method 400 can be implemented by a quantum compute device.

At 402, plaintext data is received as input. The plaintext data can include, for example, a base binary string that represents an untransformed (e.g., unencrypted) message state. Alternatively or in addition, in some implementations, the plaintext data can include an unencrypted message. The plaintext data can be functionally and/or structurally similar to the input data 302 of FIG. 3. At 404, modal superposition initialization is performed (e.g., by a component that is functionally and/or structurally similar to the modal superposition initializer 304 of FIG. 3) to generate adjacent binary states (e.g., that are adjacent to a binary state that represent the plaintext data). A modal vector is produced as output at 404.

At 406, entropy-constrained modal filtering is performed (e.g., by a component that is functionally and/or structurally similar to the model filter 306 of FIG. 3). More specifically, the modal vector produced at 404 is filtered by coherence ratio to produce a filtered vector. In some instances, some binary states can be retained within the filtered vector via entropy. At 408, indexical perturbation is performed (e.g., by a component that is functionally and/or structurally similar to the indexical perturbation component 308 of FIG. 3) by performing at least one bit flip within the filtered vector to simulate decoherence, producing a perturbed vector. At 410, recursive filtering is performed by repeating 406 and 408 N (e.g., one or more) times, retaining stable patterns to produce a stabilized vector of states.

At 412, a peeling operator (e.g., that is functionally and/or structurally similar to the peeling operator 212 of FIG. 2 and/or the peeling operator 312 of FIG. 3) removes unstable states within the stabilized vector to produce a crystalized vector. Adversarial probe simulation is performed at 414 (e.g., by a component that is functionally and/or structurally similar to the adversarial probe simulator 314 of FIG. 3) to remove a dominant path(s), producing a hardened vector of states. At 416, output sampling (e.g., uniform sampling) is performed to produce a distribution. More specifically, a structurally emulated modal density output and/or a structurally differentiated output distribution can be produced at 416, which represents an encrypted output (e.g., a final encrypted output). In some instances, the encrypted output can include an encryption key and/or an encrypted message state. Alternatively or in addition, in some instances, the encrypted output can include an encrypted message.

Figure 5:
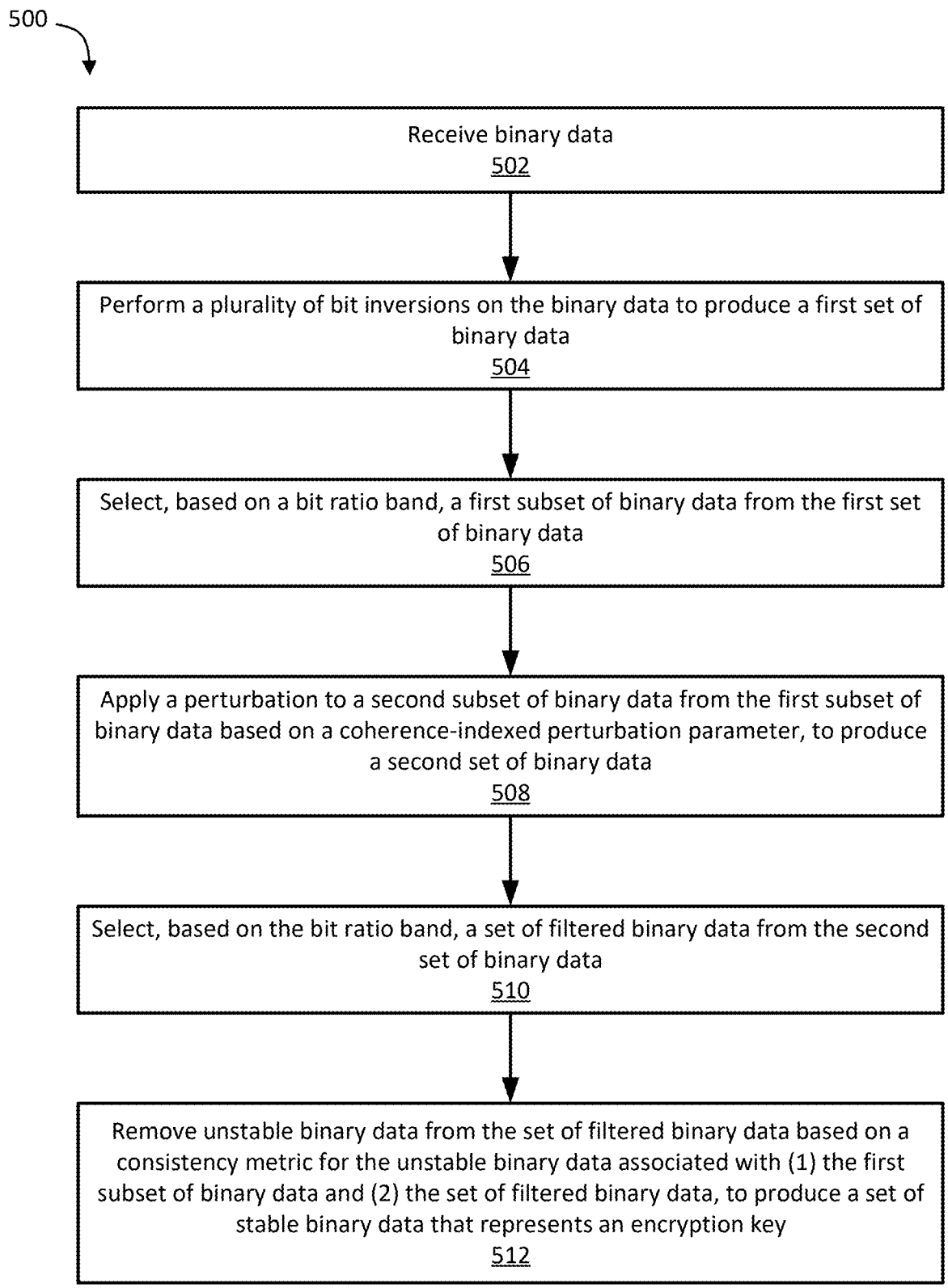
FIG. 5 shows a flow diagram illustrating a method implemented by a cryptographic system to produce a set of stable binary data that represents an encryption key, according to an embodiment.

FIG. 5 shows a flow diagram illustrating a method 500 implemented by a cryptographic system to produce a set of stable binary data that represents an encryption key, according to an embodiment. The method 500 can be implemented by a cryptographic system described herein (e.g., the cryptographic system 100 of FIG. 1). Portions of the method 500 can be implemented using a processor (e.g., the processor 220 of FIG. 2) of any suitable compute device (e.g., the compute device 201 of FIG. 2 and/or the compute devices 110 and/or 120 of FIG. 1). In some implementations, at least a portion of the method 500 can be implemented by a quantum compute device.

At 502, the method 500 includes receiving binary data and, at 504, performing a plurality of bit inversions on the binary data to produce a first set of binary data. At 506, based on a bit ratio band, a first subset of binary data is selected from the first set of binary data. A perturbation is applied at 508 to a second subset of binary data from the first subset of binary data based on a coherence-indexed perturbation parameter, to produce a second set of binary data. The method 500 at 510 includes selecting, based on the bit ratio band, a set of filtered binary data from the second set of binary data. Unstable binary data is removed at 512 from the set of filtered binary data based on a consistency metric for the unstable binary data associated with (1) the first subset of binary data and (2) the set of filtered binary data, to produce a set of stable binary data that represents an encryption key.

Figure 6:
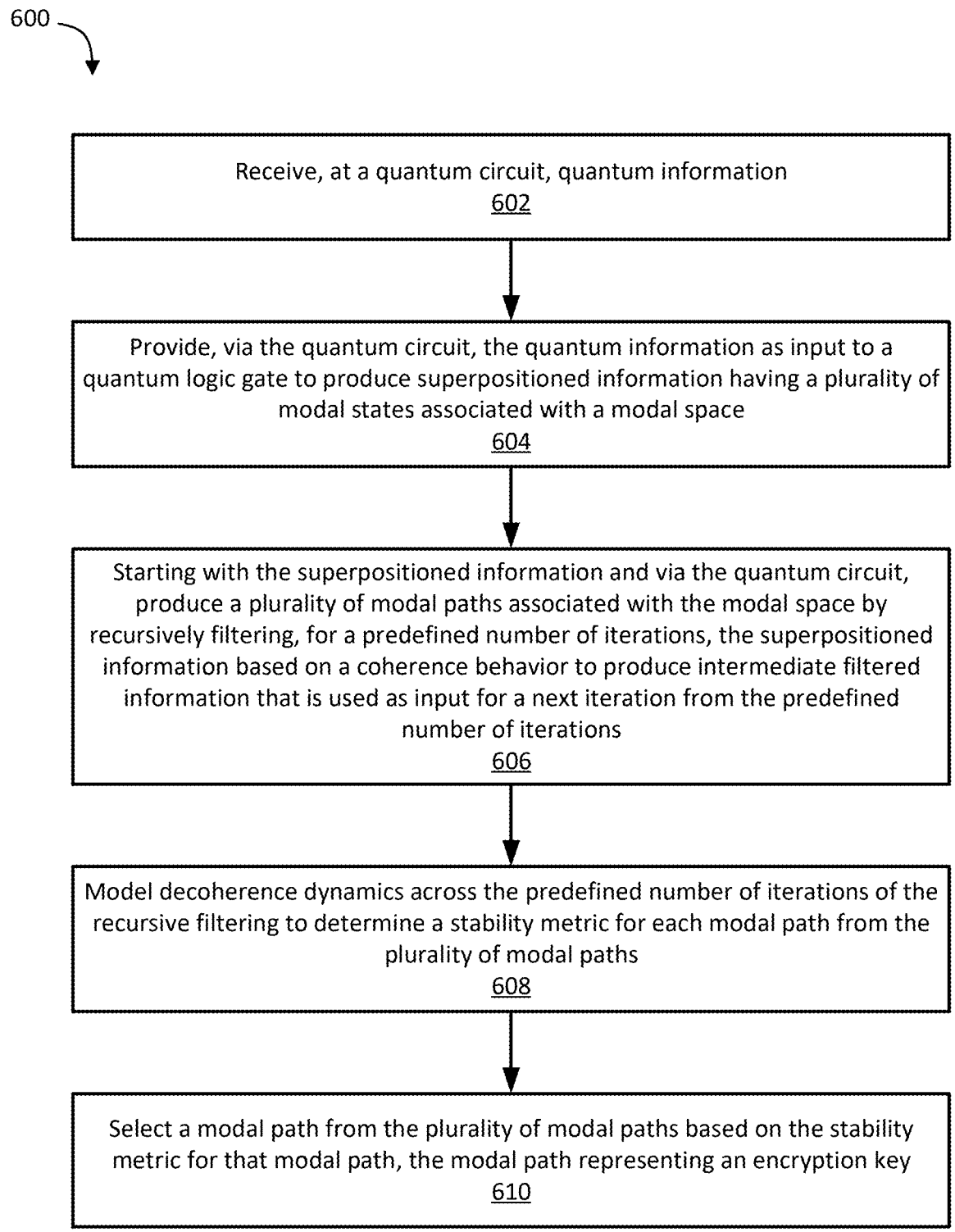
FIG. 6 shows a flow diagram illustrating a method implemented by a cryptographic system to select a modal path that represents an encryption key, according to an embodiment.

FIG. 6 shows a flow diagram illustrating a method 600 implemented by a cryptographic system to select a modal path that represents an encryption key, according to an embodiment. The method 600 can be implemented by a cryptographic system described herein (e.g., the cryptographic system 100 of FIG. 1). Portions of the method 600 can be implemented using a processor (e.g., the processor 220 of FIG. 2) of any suitable compute device (e.g., the compute device 201 of FIG. 2 and/or the compute devices 110 and/or 120 of FIG. 1). In some implementations, at least a portion of the method 600 can be implemented by a quantum compute device.

At 602, the method 600 includes receiving quantum information and, at 604, providing quantum information as input to a quantum logic gate to produce superpositioned information having a plurality of modal states associated with a modal space. Starting with the superpositioned information, at 606, a plurality of modal paths associated with the modal space is produced by recursively filtering, for a predefined number of iterations, the superpositioned information based on a coherence behavior to produce intermediate filtered information that is used as input for a next iteration from the predefined number of iterations. Decoherence dynamics is modelled at 608 across the predefined number of iterations of the recursive filtering to determine a stability metric for each modal path from the plurality of modal paths. A modal path is selected at 610 from the plurality of modal paths based on the stability metric for that modal path, the modal path representing an encryption key.

Figure 7:
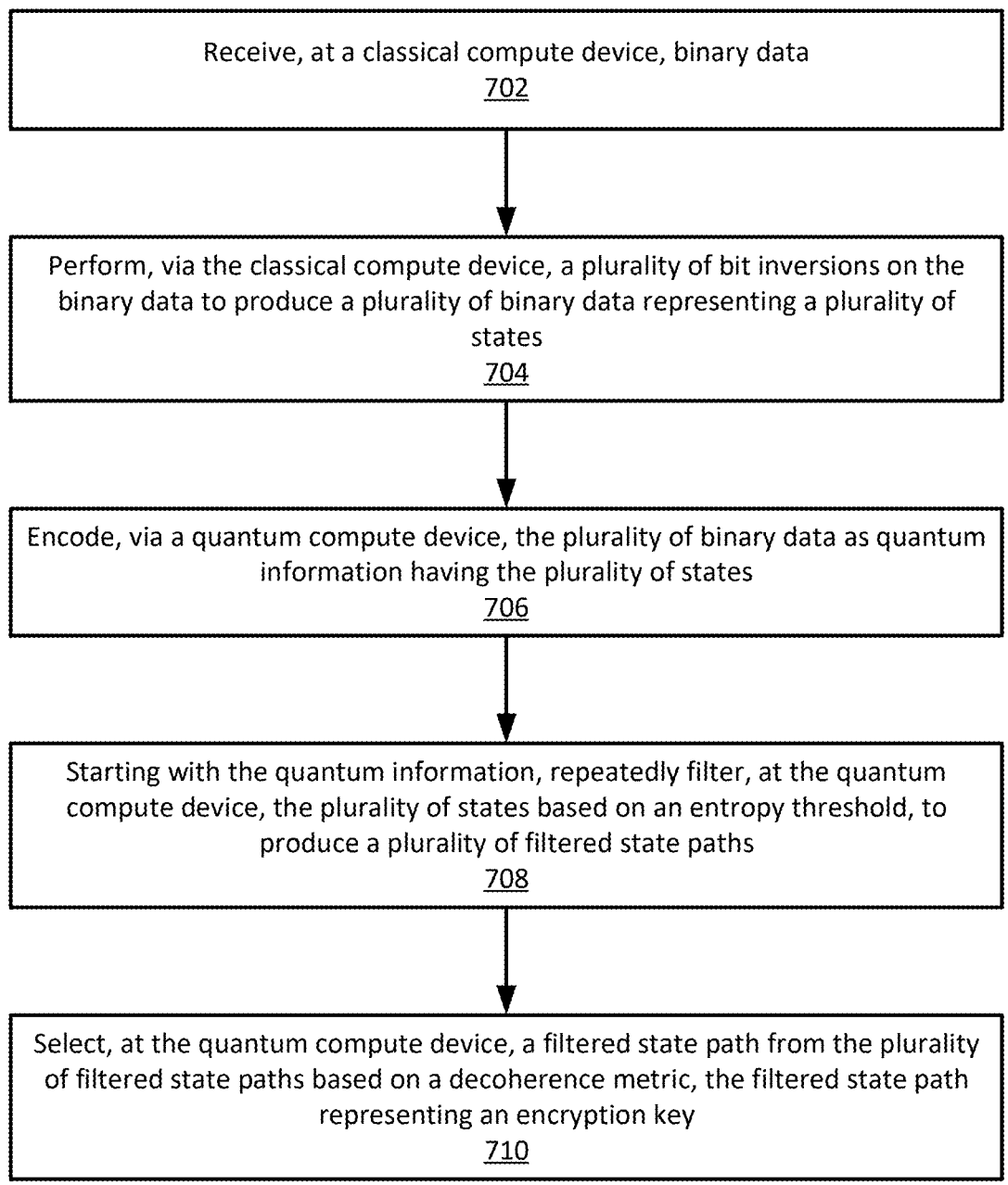
FIG. 7 shows a flow diagram illustrating a method implemented by a cryptographic system to select a filtered state path that represents an encryption key, according to an embodiment.

FIG. 7 shows a flow diagram illustrating a method 700 implemented by a cryptographic system to select a filtered state path that represents an encryption key, according to an embodiment. The method 700 can be implemented by a cryptographic system described herein (e.g., the cryptographic system 100 of FIG. 1). Portions of the method 700 can be implemented using a processor (e.g., the processor 220 of FIG. 2) of any suitable compute device (e.g., the compute device 201 of FIG. 2 and/or the compute devices 110 and/or 120 of FIG. 1). In some implementations, at least a portion of the method 700 can be implemented by a quantum compute device.

At 702, the method 700 includes receiving, at a classical compute device, binary data and, at 704, performing, via the classical compute device, a plurality of bit inversions on the binary data to produce a plurality of binary data representing a plurality of states. The method 700 further includes, at 706, encoding, via a quantum compute device, the plurality of binary data as quantum information having the plurality of states. At 708, starting with the quantum information, the plurality of states is repeatedly filtered at the quantum compute device and based on an entropy threshold, to produce a plurality of filtered state paths. The method 700 at 710 includes selecting, at the quantum compute device, a filtered state path from the plurality of filtered state paths based on a decoherence metric, the filtered state path representing an encryption key.

In some embodiments, a cryptographic method includes harvesting quantum entropy and structurally filtering said entropy for use in encryption. In some implementations, the filtering is based on entanglement coherence and decoherence indexing. In some implementations, the entropy is provided by a hardware quantum random number generator (QRNG). In some implementations, the filtering occurs through a nonlinear hash function mapped to coherence constraints. In some implementations, the structural filtering prevents repeatable key generation.

In some embodiments, a system for encrypting data includes an entropy source, a structural filter, a key generator, an encryption engine, and a logging mechanism. In some implementations, the encryption engine encrypts plaintext using a key validated by a coherence index signature. In some implementations, the system further includes a decryption module that verifies entropy metadata and coherence structure prior to decryption. In some implementations, the entropy metadata includes an entropy hash and decoherence integrity index. In some implementations, the system is deployed within an embedded processor or edge computing device.

In one or more embodiments, a system for encrypting data is structurally constrained and configured to withstand one or more known types of quantum attack without relying on any computational hardness assumptions and/or using a combination of two or more of quantum entropy, structural entanglement filtering, or decoherence-indexed key generation.

In one or more embodiments, inputs to a system for encrypting data include one or more of plaintext data, a quantum entropy source(s), an authentication credential(s), or a policy parameter(s). Alternatively or in addition, during operation of the system for encrypting data, one or more of the following transformative steps are performed: sampling of quantum entropy, structural filtering via entanglement integrity, decoherence-indexed key generation, adaptive encryption, or integrity vault logging. Alternatively or in addition, during operation of the system for encrypting data, one or more of the following outputs are generated: encrypted ciphertext, an integrity log(s), or a quantum-authenticated hash(es). Alternatively or in addition, operation of the system for encrypting data can result in one or more of: a reduction or elimination of algebraic vulnerability, a reduction or elimination of algebraic structure(s), a quantifiable entropy metric(s), or a tamper-resilient structure.

One or more embodiments of the present disclosure describe a system or method that, when implemented, exhibits one or more of the following technological improvements relative to known systems or methods: quantum attack resistance, a lack of a dependency on math, quantum entropy support, API adaptability, entropy audit trails, forward secrecy and/or scalability.

According to an embodiment, a non-transitory, processor-readable medium stores instructions that, when executed by a processor, cause the processor to receive binary data and perform a plurality of bit inversions on the binary data to produce a first set of binary data. Based on a bit ratio band, a first subset of binary data is selected from the first set of binary data. A perturbation is applied to a second subset of binary data from the first subset of binary data based on a coherence-indexed perturbation parameter, to produce a second set of binary data. The instructions further cause the processor to select, based on the bit ratio band, a set of filtered binary data from the second set of binary data. Unstable binary data is removed from the set of filtered binary data based on a consistency metric for the unstable binary data associated with (1) the first subset of binary data and (2) the set of filtered binary data, to produce a set of stable binary data that represents an encryption key.

In some implementations, the set of stable binary data is a first set of stable binary data, and the non-transitory, processor-readable medium further stores instructions to cause the processor to remove semantically redundant stable binary data from the first set of stable binary data based on modal coherence variation, to produce a second set of stable binary data that represents a hardened encryption key. In some implementations, the non-transitory, processor-readable medium further stores instructions to cause the processor to select stable binary data from the set of stable binary data based on semantic variation, to generate a structurally differentiated output distribution that encodes the encryption key.

In some implementations, the non-transitory, processor-readable medium further stores instructions to cause the processor to receive unencrypted data and encrypt the unencrypted data to produce encrypted data, based on the set of stable binary data. The non-transitory, processor-readable medium further stores instructions to generate metadata that indicates at least one of (1) an entropy-integrity log or (2) a structural coherence signature, the metadata being used for decrypting the encrypted data to produce the unencrypted data. In some implementations, the binary data includes a binary string, and the first set of binary data includes the binary string and a plurality of modified binary strings, each modified binary string from the plurality of modified binary strings (1) differing from the binary string by one bit, and (2) being different from remaining modified binary strings from the plurality of modified binary strings.

In some implementations, a bit ratio band for each binary data from the first set of binary data defines a range of ratios of a number of occurrences of a bit value within that binary data relative to a total number of bits from that binary data. Additionally, the instructions to cause the processor to select the first subset of binary data from the first set of binary data include instructions to cause the processor to select the first subset of binary data based on a bit ratio for each binary data from the first subset of binary data being within the bit ratio band.

In some implementations, the non-transitory, processor-readable medium further stores instructions to cause the processor to select binary data from the first set of binary data under at least one structural filtering constraint, the selected binary data having an associated bit ratio that indicates one of low coherence or high coherence. The selected binary data is added to the first subset of binary data. In some implementations, the instructions to cause the processor to apply the perturbation to each binary data from the second subset of binary data include instructions to cause the processor to, for each binary data from the second subset of binary data, (1) select a bit under constrained coherence variation from that binary data, and (2) invert the selected bit to produce perturbed binary data.

In some implementations, the non-transitory, processor-readable medium further stores instructions to cause the processor to repeatedly produce a number of intermediate sets of filtered data before producing the set of filtered binary data, the number of intermediate sets of filtered data being based on an entropy spread metric associated with the first subset of binary data.

According to an embodiment, a method includes receiving and providing quantum information as input to a quantum logic gate to produce superpositioned information having a plurality of modal states associated with a modal space. Starting with the superpositioned information, a plurality of modal paths associated with the modal space is produced by recursively filtering, for a predefined number of iterations, the superpositioned information based on a coherence behavior to produce intermediate filtered information that is used as input for a next iteration from the predefined number of iterations. Decoherence dynamics is modelled across the predefined number of iterations of the recursive filtering to determine a stability metric for each modal path from the plurality of modal paths. A modal path is selected from the plurality of modal paths based on the stability metric for that modal path, the modal path representing an encryption key.

In some implementations, the method further includes, between the modelling and the selecting, performing a statistical thinning of the plurality of modal paths to remove a dominant mode from the plurality of modal paths. In some implementations, the quantum logic gate includes at least one of a Hadamard gate, an RX gate, or an RZ gate. In some implementations, the modelling the decoherence dynamics across the predefined number of iterations of the recursive filtering includes measuring at least one of (1) qubit stability associated with the intermediate filtered information or (2) a readout noise metric associated with the quantum circuit. In some implementations, the method further includes mapping the modal path selected from the plurality of modal paths to a quantum register that represents an addressable semantic path that represents the encryption key.

In some implementations, the recursively filtering the superpositioned information includes applying at least one of a coherence-aware gate sequence or a controlled entanglement, to at least one of the superpositioned information or the intermediate filtered information, to produce measurement history data. The method further includes producing the plurality of modal paths based on the measurement history data. In some implementations, the method further includes generating the quantum information via a quantum random number generator (QRNG).

According to an embodiment, a method includes receiving, at a classical compute device, binary data and performing, via the classical compute device, a plurality of bit inversions on the binary data to produce a plurality of binary data representing a plurality of states. The method further includes encoding, via a quantum compute device, the plurality of binary data as quantum information having the plurality of states. Starting with the quantum information, the plurality of states is repeatedly filtered at the quantum compute device and based on an entropy threshold, to produce a plurality of filtered state paths. The method further includes selecting, at the quantum compute device, a filtered state path from the plurality of filtered state paths based on a decoherence metric, the filtered state path representing an encryption key.

In some implementations, the entropy threshold indicates a minimum stability level associated with each state from the plurality of filtered state paths. In some implementations, the decoherence metric indicates at least one of qubit state decay or readout noise, associated with the plurality of filtered state paths. In some implementations, the decoherence metric indicates, for each filtered state path from the plurality of filtered state paths, a persistence during the repeated filtering of a state from that filtered state path.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium and/or a machine-readable medium) having instructions or computer code thereon for performing various computer-implemented operations. The computer-readable medium (or processor-readable medium, machine-readable medium, etc.) is non-transitory in the sense that it does not include transitory propagating signals per sc (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A non-transitory, processor-readable medium storing instructions that, when executed by a processor, cause the processor to:
receive binary data;
perform a plurality of bit inversions on the binary data to produce a first set of binary data;
select, based on a bit ratio band, a first subset of binary data from the first set of binary data;
apply a perturbation to a second subset of binary data from the first subset of binary data based on a coherence-indexed perturbation parameter, to produce a second set of binary data;
select, based on the bit ratio band, a set of filtered binary data from the second set of binary data; and
remove unstable binary data from the set of filtered binary data based on a consistency metric for the unstable binary data associated with (1) the first subset of binary data and (2) the set of filtered binary data, to produce a set of stable binary data that represents an encryption key.

2. The non-transitory, processor-readable medium of claim 1, wherein the set of stable binary data is a first set of stable binary data, the non-transitory, processor-readable medium further storing instructions to cause the processor to:
remove semantically redundant stable binary data from the first set of stable binary data based on modal coherence variation, to produce a second set of stable binary data that represents a hardened encryption key.

3. The non-transitory, processor-readable medium of claim 1, further storing instructions to cause the processor to:
select stable binary data from the set of stable binary data based on semantic variation, to generate a structurally differentiated output distribution that encodes the encryption key.

4. The non-transitory, processor-readable medium of claim 1, further storing instructions to cause the processor to:
receive unencrypted data;
encrypt the unencrypted data to produce encrypted data, based on the set of stable binary data; and
generate metadata that indicates at least one of (1) an entropy-integrity log or (2) a structural coherence signature, the metadata being used for decrypting the encrypted data to produce the unencrypted data.

5. The non-transitory, processor-readable medium of claim 1, wherein:
the binary data includes a binary string; and
the first set of binary data includes the binary string and a plurality of modified binary strings, each modified binary string from the plurality of modified binary strings (1) differing from the binary string by one bit, and (2) being different from remaining modified binary strings from the plurality of modified binary strings.

6. The non-transitory, processor-readable medium of claim 1, wherein:
the bit ratio band is from a plurality of bit ratio bands, each bit ratio band from the plurality of bit ratio bands being associated with the first set of binary data;
each bit ratio band for each binary data from the first set of binary data defines a range of ratios of a number of occurrences of a bit value within that binary data relative to a total number of bits from that binary data; and
the instructions to cause the processor to select the first subset of binary data from the first set of binary data include instructions to cause the processor to select the first subset of binary data based on a bit ratio for each binary data from the first subset of binary data being within the bit ratio band for that binary data.

7. The non-transitory, processor-readable medium of claim 1, further storing instructions to cause the processor to:
select binary data from the first set of binary data under at least one structural filtering constraint, the selected binary data having an associated bit ratio that indicates one of low coherence or high coherence; and
add the selected binary data to the first subset of binary data.

8. The non-transitory, processor-readable medium of claim 1, wherein the instructions to cause the processor to apply the perturbation to each binary data from the second subset of binary data include instructions to cause the processor to:
for each binary data from the second subset of binary data:
select a bit under constrained coherence variation from that binary data, and
invert the selected bit to produce perturbed binary data.

9. The non-transitory, processor-readable medium of claim 1, further storing instructions to cause the processor to:
repeatedly produce a number of intermediate sets of filtered data before producing the set of filtered binary data, the number of intermediate sets of filtered data being based on an entropy spread metric associated with the first subset of binary data.

10. A method, comprising:
receiving, at a processor, binary data;
performing, via the processor, a plurality of bit inversions on the binary data to produce a first set of binary data;
selecting, via the processor and based on a bit ratio band, a first subset of binary data from the first set of binary data;
applying, via the processor, a perturbation to a second subset of binary data from the first subset of binary data based on a coherence-indexed perturbation parameter, to produce a second set of binary data;
selecting, via the processor and based on the bit ratio band, a set of filtered binary data from the second set of binary data; and
removing, via the processor, unstable binary data from the set of filtered binary data based on a consistency metric for the unstable binary data associated with (1) the first subset of binary data and (2) the set of filtered binary data, to produce a set of stable binary data that represents an encryption key.

11. The method of claim 10, wherein the set of stable binary data is a first set of stable binary data, the method further comprising:
removing, via the processor, semantically redundant stable binary data from the first set of stable binary data based on modal coherence variation, to produce a second set of stable binary data that represents a hardened encryption key.

12. The method of claim 10, further comprising:
selecting, via the processor, stable binary data from the set of stable binary data based on semantic variation, to generate a structurally differentiated output distribution that encodes the encryption key.

13. The method of claim 10, further comprising:
receiving, at the processor, unencrypted data;
encrypting, via the processor, the unencrypted data to produce encrypted data, based on the set of stable binary data; and
generating, via the processor, metadata that indicates at least one of (1) an entropy-integrity log or (2) a structural coherence signature, the metadata being used for decrypting the encrypted data to produce the unencrypted data.

14. The method of claim 10, wherein:
the binary data includes a binary string; and
the first set of binary data includes the binary string and a plurality of modified binary strings, each modified binary string from the plurality of modified binary strings (1) differing from the binary string by one bit, and (2) being different from remaining modified binary strings from the plurality of modified binary strings.

15. The method of claim 10, wherein:
the bit ratio band is from a plurality of bit ratio bands, each bit ratio band from the plurality of bit ratio bands being associated with the first set of binary data;
each bit ratio band for each binary data from the first set of binary data defines a range of ratios of a number of occurrences of a bit value within that binary data relative to a total number of bits from that binary data; and
the selecting the first subset of binary data from the first set of binary data includes selecting, via the processor, the first subset of binary data based on a bit ratio for each binary data from the first subset of binary data being within the bit ratio band for that binary data.

16. The method of claim 10, further comprising:
selecting, via the processor, binary data from the first set of binary data under at least one structural filtering constraint, the selected binary data having an associated bit ratio that indicates one of low coherence or high coherence; and
adding, via the processor, the selected binary data to the first subset of binary data.

17. The method of claim 10, wherein the applying the perturbation to each binary data from the second subset of binary data includes:
for each binary data from the second subset of binary data:
selecting, via the processor, a bit under constrained coherence variation from that binary data, and
inverting, via the processor, the selected bit to produce perturbed binary data.

18. The method of claim 10, further comprising:
repeatedly producing, via the processor, a number of intermediate sets of filtered data before producing the set of filtered binary data, the number of intermediate sets of filtered data being based on an entropy spread metric associated with the first subset of binary data.

19. A system, comprising:
a processor; and
a memory operably coupled to the processor, the memory storing instructions to cause the processor to:
receive binary data;
perform a plurality of bit inversions on the binary data to produce a first set of binary data;
select, based on a bit ratio band, a first subset of binary data from the first set of binary data;
apply a perturbation to a second subset of binary data from the first subset of binary data based on a coherence-indexed perturbation parameter, to produce a second set of binary data;
select, based on the bit ratio band, a set of filtered binary data from the second set of binary data; and
remove unstable binary data from the set of filtered binary data based on a consistency metric for the unstable binary data associated with (1) the first subset of binary data and (2) the set of filtered binary data, to produce a set of stable binary data.

20. The system of claim 19, wherein the set of stable binary data represents an encryption key.

\* \* \* \* \*